D.C. POWER SUPPLY WITH FAST INITIAL CURRENT BUILDUP AND LIMITS ON MAXIMUM AND MINIMUM CURRENT DURING STARTING
Filed July 30, 1964
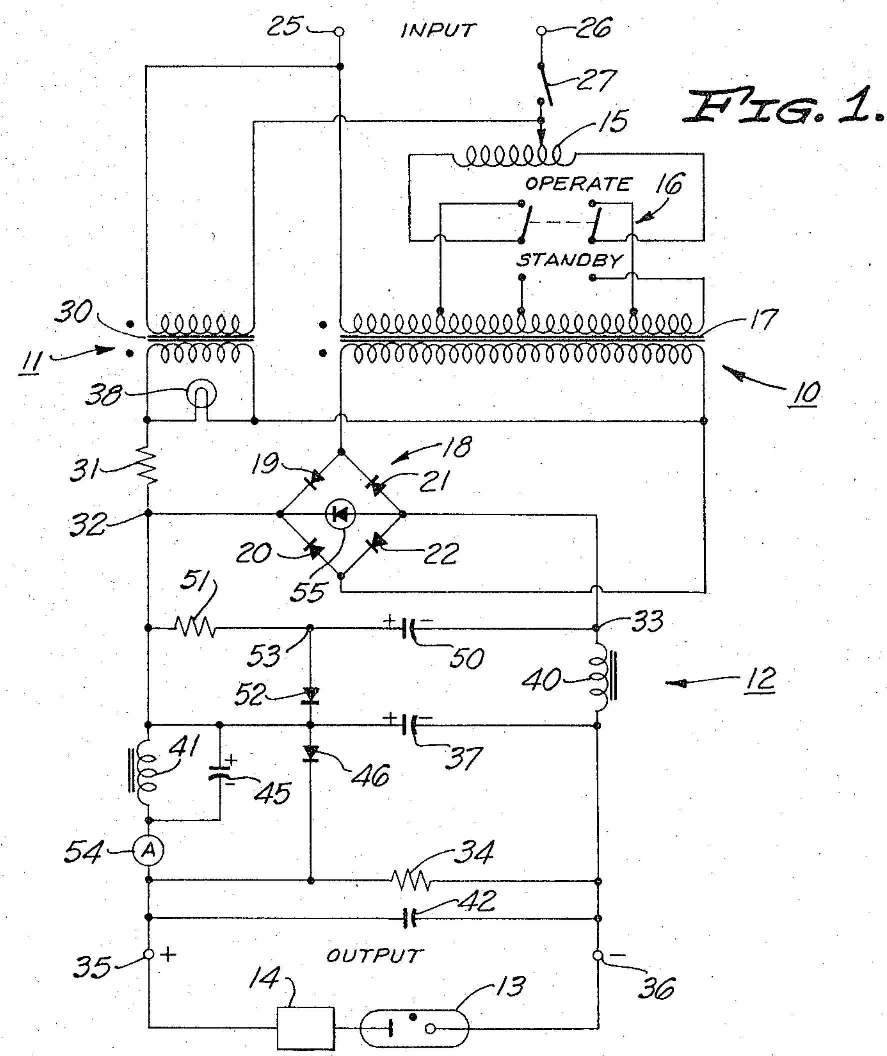
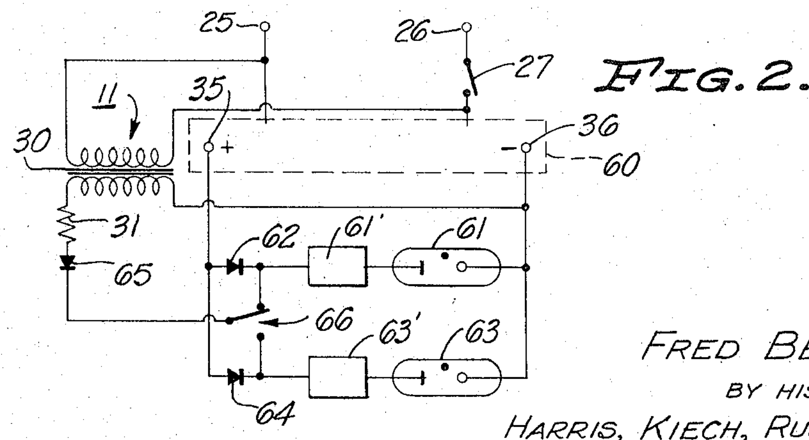
INVENTOR
FRED BENJAMIN
BY HIS ATTORNEYS
HARRIS, KIECH, RUSSELL & KERN 3,365,648

D.C. POWER SUPPLY WITH FAST INITIAL CURRENT BUILDUP AND LIMITS ON MAXIMUM AND MINIMUM CURRENT DURING STARTING

Fred Benjamin, Fullerton, Calif., assignor to Christie Electric Corp., Los Angeles, Calif., a corporation of California Filed July 30, 1964, Ser. No. 386,352
11 Claims. (Cl. 321—10)

ABSTRACT OF THE DISCLOSURE

A D.C. power supply for operating a xenon arc lamp. A circuit with a first source for the main current and a second source for additional starting current to provide a high open circuit voltage and fast initial current buildup, with limits on maximum and minimum current during starting period.

This invention relates to direct current power supplies and, in particular, to a power supply especially suited for operating a xenon arc lamp. Xenon arc lamps place severe and somewhat conflicting requirements on the characteristics of the power supplies used therewith, particularly during lamp starting. It is an object of the present invention to provide a new and improved power supply which meets the requirements for the operation of xenon arc lamps and one which utilizes a minimum of large and therefore expensive components.

In the operation of a xenon arc lamp, it is desirable to provide a high open circuit voltage for initiating the arc, which open circuit voltage may be several times the operating voltage. It is also desirable to provide a very fast initial current buildup for dependable lamp ignition while at the same time limiting the maximum starting current and maintaining a minimum starting current. As a typical example, it is usually desirable to have the initial current reach nominal lamp current in a fraction of a millisecond while at the same time limiting the starting current transient overshoot and subsequent undershoot. It is also desirable to provide a supply with high output impedance throughout the frequencies of interest, e.g., zero to ten kilocycles per second, and one having a heavily filtered output with very low current ripple and including means for current adjustment under normal operating conditions as well as providing for changing between operating and standby conditions without disturbing the settings of the apparatus.

It is an object of the invention to accomplish these desirable features in a single power supply and one which is not limited to use with xenon arc lamps and which may be used with other D.C. loads.

It is a particular object of the invention to provide a direct current power supply for a load such as a xenon arc lamp or the like and including a first voltage source having an alternating current input and a direct current output and including rectifier means for rectification of the alternating current input voltage to a rectified output voltage, a filter for the rectified output voltage and including a shun capacitance, and a series output inductance, providing the power supply filtered output for the load across the capacitance and output inductance, a second voltage source having an alternating current input and a direct current output and including rectifier means for rectification of the A.C. input voltage to a rectified output voltage, the second voltage source including current limiting means for limiting the output current thereof, and circuit means for connecting the outputs of the first and second voltage sources in parallel or aiding relation to the load.

It is a further object to provide such a power supply including circuit means for bypassing the output inductance for fast initial current buildup and minimum inductance saturation and including a unidirectional conducting element and/or a capacitance connected in parallel with the output inductance. Another object of the invention is to provide such a power supply including circuit means for supplying energy to the shunt capacitance during initial current buildup for maintaining a minimum current and including a capacitance and a resistance connected in series across a rectified output of the first voltage source and a unidirectional conducting element connected in parallel with the resistance and polarized for conduction around the resistance during discharge of the capacitance.

It is a further object to provide such a power supply in which the second voltage source may be connected in parallel with the first voltage source or in series with the first voltage source, and in which the second voltage source may be combined with the first voltage source at the input to the filter or at the input to the load. A particular object is to provide such a power supply in which the second voltage source may utilize one or more of the rectifier elements of the first voltage source. An additional object of the invention is to provide such a power supply with various arrangements suitable for operation of a single arc lamp or for operation of a plurality of lamps.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is an electrical diagram of a preferred form of the power supply; and

FIG. 2 is an electrical diagram illustrating an alternative embodiment suitable for use with a pair of lamps as a load.

The apparatus of FIG. 1 includes a first voltage source 10, a second voltage source 11, a filter 12, and a lamp 13 and lamp igniter 14 connected as a load.

The voltage source 10 includes an autotransformer 15, a double-pole double-throw switch 16, a transformer 17, typically a high impedance transformer, and a full wave rectifier unit 18 having four rectifier elements 19–22. The alternating current line input is connected at terminals 25, 26 and a switch 27 provides for turning the supply on and off. Line terminal 25 is connected to one end of the primary of the transformer 17 and line terminal 26 is connected through the switch 27 to the moving contact of the autotransformer 15. The winding of the autotransformer 15 is connected to the arm of the switch 16 for connecting the autotransformer across two different portions of the primary of the transformer 17.

The voltage source 10 provides the main current supply for the load under operation conditions. Through use of the separate low power source 11, the combined power capacity and size of sources 10 and 11 is reduced to a fraction of the size necessary for a conventional single source. The voltage source 10 is illustrated as a single phase unregulated source. However, multiphase sources and various forms of regulated sources may be utilized if desired. The autotransformer 15 provides a means for adjusting the output current during operation of a lamp. The switch 16 provides for a higher output current range which is normally the operating current range and a low output current range which is normally the standby range. This switch permits changing of a lamp from full output to a standby or lower output without disturbing the current setting of the autotransformer and without extinguishing the lamp, thereby reducing the number of lamp starts.

The voltage source 11 is a low power output source which provides a high open circuit voltage for initiating operation of the lamp. Typically, the transformer 30 of the voltage source 11 will have a secondary voltage such that the D.C. open circuit output voltage is in the order of two to four times that of the output voltage of the supply under load. In the circuit of FIG. 1, the voltage source 11 utilizes the rectifier element 22 as its rectifier, with the secondary of the transformer 30 connected across the rectifier element 22 through a resistor 31. The output from the voltage source 11 is connected in parallel and in aiding relation with the output from the voltage source 10 at the terminals 32, 33 which may be considered the input terminals to the filter 12. Rectifier element 19 prevents loading of the higher voltage secondary of the transformer 30 by the lower voltage secondary of the transformer 17 and the resistor 31 effectively decouples the higher voltage of the transformer 30 from the lower voltage of the transformer 17 during running condition after the arc load is operating. A resistor 34 is connected across the load terminals 35, 36 and in conjunction with the resistor 31 functions as a voltage divider for determining the voltage to which capacitor 37 of the filter 12 is charged by the voltage source 11. The resistor 34 also functions to discharge capacitors 37 and 50 after the unit is turned off, for personnel safety. A lamp 38 may be connected across the secondary of the transformer 30 to provide an indication when the apparatus is turned on.

Various other arrangements may be utilized for the voltage source 11. For example, a separate rectifier may be utilized. In another alternative, the voltage source 11 may be connected in series with the voltage source 10. In another alternative, the voltage source 11 may be connected at the output of the power supply rather than at the input to the filter section. The secondary winding for the source 11 may be a winding on the transformer 17.

The filter 12 preferably includes an inductance 40, the capacitor 37 and another inductance 41. The inductance 40 may be omitted in some equipments where optimum filtering is not required. Another capacitance 42 may be connected across the filter output. However, the capacitance 42 does not function to filter the rectified voltage but is utilized as a high frequency bypass and may be in the order of .01 microfarad.

The filter 12 has an inductor in the output because it is most undesirable to have a power frequency filtering capacitance in the output of a supply for an arc lamp. The inductor 41 serves to limit the initial current overshoot upon lamp ignition to protect the lamp, particularly the seals.

Where it is desirable to limit the peak initial current, it is also desirable to have the initial current build up very rapidly. For dependable lamp ignition, the current should reach rated current in a fraction of a millisecond. Furthermore, current ripple during lamp operation should be very small. These conflicting requirements cannot be satisfied with conventional filters having either an inductor in the output or a capacitor in the output. An important feature of the power supply in the present application is the provision of circuitry for bypassing the inductor 41 during starting conditions to achieve both the desired fast current buildup and the desired current maximum limitation. In the preferred form illustrated herein, a capacitance 45 and a rectifier 46 are connected across the inductor 41. The desired operation may be achieved with either the capacitor 45 or the rectifier 46 but improved results are obtained when both are present. The value of the capacitance 45 may be selected to tune the inductance 41 at the riple frequency of the rectified voltage and thereby improve the direct current output. In one embodiment of the supply now in use, this arrangement reduces the magnitude of the ripple by one half. At the same time, the rectifier 46 functions to prevent saturation of the inductor 41 under high current load conditions.

The desired fast initial current buildup is achieved by selecting the capacitor 45 and rectifier 46 to transmit the transient starting current provided initially by the filter capacitor 37, with a time constant low enough to transmit the current in the desired short time, while having a high enough resistance to not adversely affect the peak current limiting function of the inductor 41 nor the filtering function of the inductor under normal operating current conditions. The usual peak initial current is produced by the energy stored in the capacitor of the filter. The inductor shunting circuit with provides the fast initial current buildup also provides the initial current peak limiting by utilizing the peak producing energy to produce the fast buildup instead.

When a lamp is connected to the power supply output, the capacitor 37 of the filter discharges its energy into the load providing the initial current buildup. In a conventional power supply, this energy may be dissipated and the current may drop back to a very low value before new energy can be supplied from the voltage source, especially with a high impedance transformer. In the igniting of an arc lamp, it is desirable to maintain the current above a minimum value at all times for dependable ignition without undue deterioration of the lamp. In most situations it is desirable to prevent this current undershoot from going below the operating lamp current. The problem is particularly severe in connection with signal-phase circuits where the rectified voltage goes to zero every half cycle. Circuitry is provided in the power supply of the present application for maintaining a minimum current output during the initial current buildup.

This circuitry may include a capacitor 50 connected in series with a resistor 51 across the filter input and a rectifier 52 connected between the junction 53 and the capacitor 37. The capacitor 50 is charged directly from the rectified output voltage with the resistor 51 serving as a current limiting device for maintaining the ripple current through the capacitor to a safe value. The rectifier 52 provides for bypassing of the current limiting resistor 51 during discharge of the capacitor 50, permitting transfer of energy from the capacitor 50 to the load. This combination of resistor 51 and rectifier 52 uniquely limits heating of capacitor 50 and permits use of a capacitor of a fraction of the size otherwise necessary. Under normal operating conditions, the capacitor 50 has substantially no effect on the overall circuitry as the rectifier 52 would discharge the capacitor 50 through the load faster than it could be charged through the resistor 51. However, under starting conditions the capacitor 50 does charge because there is virtually no load with the lamp disconnected from the power supply output. The capacitor 50 functions to eliminate the first dip in the rectified voltage following connection of a load to the power supply. A stable arc is established in a lamp by the end of the next half cycle and the current load will be sufficiently constant thereafter.

An ammeter 54 is provided in one of the output lines for indicating the load current of the supply. A surge protector 55 is connected across the terminals 32, 33 at the filter input to provide protection against voltage surges in either the D.C. output lines or the A.C. power lines.

In a typical circuit for supplying 17–28 amperes output current at 17–26 volts D.C. from a 115 volts A.C. input, the components may be selected as follows:

Resistor 31—1000 ohms, 25 watts
Resistor 34—7.5K ohms, 3 watts
Resistor 51—1000 ohms, 5 watts
Capacitor 37—4000 microfarads
Capacitor 45—150 microfarads
Capacitor 42—.02 microfarad
Capacitor 50—2000 microfarads Inductor 40—2.7 millihenrys
Inductor 41—7 millihenrys
Rectifiers 19, 20—Type 1N1186
Rectifiers 21, 22—Type 1N1186R
Rectifiers 46 and 52—Type A4D15DEGN (International Rectifier)

The transformer 17 may have a three-to-one stepdown ratio and the transformer 30 may have a one-to-one ratio. In this embodiment, the rectifiers 46 and 52 are provided in a single rectifier assembly.

An alternative arrangement particularly suited for the operation of more than one lamp in parallel is shown in FIG. 2, where components corresponding to those of the circuit of FIG. 1 are identified by the same reference numerals. The circuitry of the box 60 may be the voltage source 10 and filter 12 of FIG. 1. A lamp 61 with igniter 61′ is connected as a load across the terminals 35, 36 through a blocking rectifier 62 and another lamp 63 with igniter 63′ is similarly connected through another blocking rectifier 64. The voltage source 11 utilizes the transformer 30 and resistor 31 of FIG. 1 with a separate rectifier element 65 and is connected at the output of the power supply between terminal 36 and the moving arm of a single-pole double-throw switch 66. Each fixed terminal of the switch 66 is connected to a lamp at the junction of the lamp and the associated blocking rectifier. With the switch 66 in the position shown in FIG. 2, the voltage from the source 11 is combined in aiding relation across the lamp 61 with the main voltage from the power supply to provide the desired high open circuit voltage for starting. The rectifier 62 blocks the voltage of the source 11 from the main supply and from the lamp 63.

After the stable arc is established in the lamp 61 and it is desired to ignite the lamp 63, the switch 66 is moved to the opposite position applying the high open circuit voltage to the lamp 63. The lamp 61 may continue to operate or may be turned off as desired.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a direct current power supply for a load such as a xenon arc lamp or the like, the combination of:
a first voltage source having an alternating current input and a direct current output and including rectifier means for rectification of the alternating current input voltage to a rectified output voltage;
a filter for said rectifier output voltage and including a first shunt capacitance and a series output inductance, providing the power supply filtered output for the load across said first capacitance and inductance;
a second voltage source having an alternating current input nad a direct current output and including rectifier means for rectification of the A.C. input voltage to a rectified output voltage, said second voltage source including curent limiting means for limiting the output current thereof;
circuit means for connecting the outputs of said first and second voltage sources in aiding relation to the load;
circuit means for bypassing said output inductance for fast initial current buildup and including a first unidirectional conducting element and a second capacitance connected in parallel with said inductance; and
circuit means for supplying energy to said first capacitance during initial current buildup for maintaining a minimum current and including a third capacitance and a resistance connected in series across the rectified output of said first voltage source, and a second unidirectional conducting element connected in parallel with said resistance and polarized for conduction around said resistance during discharge of said third capacitance.

2. In a direct current power supply for a load such as a xenon arc lamp or the like, the combination of:
a first voltage source having an alternating current input and a direct current output and including rectifier means for rectification of the alternating current input voltage to a rectified output voltage;
a filter for said rectified output voltage and including a first shunt capacitance and a series output inductance, providing the power supply filtered output for the load across said first capacitance and inductance;
a second voltage source having an alternating current input and a direct current output and including rectifier means for rectification of the A.C. input voltage to a rectified output voltage, said second voltage source including current limiting means for limiting the output current thereof;
circuit means for connecting the outputs of said first and second voltage sources in aiding relation to the load; and
circuit means connected across said output inductance for bypassing said output inductance for fast initial current buildup and including a first unidirectional conducting element and a second capacitance connected in parallel with said inductance.

3. In a direct current power supply for a load such as a xenon arc lamp or the like, the combination of:
a first voltage source having an alternating current input and a direct current output and including rectifier means for rectification of the alternating current input voltage to a rectified output voltage;
a filter for said rectified output voltage and including a first shunt capacitance and a series output inductance, providing the power supply filtered output for the load across said first capacitance and inductance;
a second voltage source having an alternating current input and a direct current output and including rectifier means for rectification of the A.C. input voltage to a rectified output voltage, said second voltage source including current limiting means for limiting the output current thereof;
circuit means for connecting the outputs of said first and second voltage sources in aiding relation to the load; and
circuit means for supplying energy to said first capacitance during initial current buildup for maintaining a minimum current and including a second capacitance and a resistance connected in series across the rectified output of said first voltage source, and a first unidirectional conducting element connected in parallel with said resistance and polarized for conduction around said resistance during discharge of said second capacitance.

4. In a direct current power supply for a load such as a pair of xenon arc lamps or the like, the combination of:
a voltage source having an alternating current input and a direct current output and including rectifier means for rectification of the alternating current input voltage to a rectified output voltage;
a filter for said rectified output voltage and including a shunt capacitance and a series output inductance, providing the power supply filtered output for the loads across said capacitance and inductance at first and second terminals;
a second voltage source having an alternating current input and a direct current output and including rectifier means for rectification of the A.C. input voltage to a rectified output voltage, said second voltage source including current limiting means for limiting the output current thereof;
a double-throw switch having a pair of fixed terminals and a moving arm terminal;
a first reverse current blocking element connected between said first terminal and one of said fixed switch terminals;

a second reverse current blocking element connected between said first terminal and the other of said fixed switch terminals; and circuit means for connecting the output of said second terminal and said switch moving arm terminal in aiding relation with the output of said first voltage source.

5. In a direct current power supply for a load such as a xenon arc lamp or the like, the combination of:

a full wave rectifier unit;

means for connecting an alternating current voltage across said rectifier unit to provide a first rectified output voltage;

means for connecting another alternating current voltage across one arm of said rectifier unit to provide another rectified output voltage aiding said first rectified output voltage, said means including current limiting means for limiting the output current thereof;

a filter for said rectified output voltages and including a shunt capacitance and a series output inductance, providing the power supply filtered output for the load across said capacitance and inductance;

circuit means for bypassing said output inductance for fast initial current buildup and including an impedance element connected in parallel with said inductance; and circuit means for supplying energy to said capacitance during initial current buildup for maintaining a minimum current and including an energy storage element connected across the rectified output of said first voltage source.

6. In a direct current power supply for a load such as a pair of xenon arc lamps or the like, the combination of:

a first voltage source having an alternating current input and a direct current output and including rectifier means for rectification of the alternating current input voltage to a rectified output voltage;

a filter for said rectified output voltage and including a shunt capacitance and a series output inductance, providing the power supply filtered output for the loads across said capacitance and inductance at first and second terminals;

a second voltage source having an alternating current input and a direct current output and including rectifier means for rectification of the A.C. input voltage to a rectified output voltage, said second voltage source including current limiting means for limiting the output current thereof;

a double-throw switch having a pair of fixed terminals and a moving arm terminal;

a first reverse current blocking element connected between said first terminal and one of said fixed switch terminals;

a second reverse current blocking element connected between said first terminal and the other of said fixed switch terminals;

circuit means for connecting the output of said second voltage source across said second terminal and said switch moving arm terminal in aiding relation with the output of said first voltage source;

circuit means for bypassing said output inductance for fast initial current buildup and including an impedance element connected in parallel with said inductance; and circuit means for supplying energy to said capacitance during initial current buildup for maintaining a minimum current and including an energy storage element connected across the rectified output of said first voltage source.

7. In a direct current power supply for a load such as a xenon arc lamp or the like, the combination of:

a first voltage source having an alternating current input and a direct current output and including rectifier means for rectification of the alternating current input voltage to a rectified output voltage;

a filter for said rectified output voltage and including a shunt capacitance and a series output inductance, providing the power supply filtered output for the load across said capacitance and inductance;

a second voltage source having an alternating current input and a direct current output and including rectifier means for rectification of the A.C. input voltage to a rectified output voltage, said second voltage source including current limiting means for limiting the output current thereof;

circuit means for connecting the outputs of said first and second voltage sources in aiding relation to the load;

circuit means for bypassing said output inductance for fast initial current buildup and including an impedance element connected in parallel with said inductance; and circuit means for supplying energy to said capacitance during initial current buildup for maintaining a minimum current and including an energy storage element connected across the rectified output of said first voltage source.

8. In a direct current power supply for a load such as a xenon arc lamp or the like, the combination of:

a first voltage source having an alternating current input and a direct current output and including rectifier means for rectification of the alternating current input voltage to a rectified output voltage;

a filter for said rectified output voltage and including a shunt capacitance and a series output inductance, providing the power supply filtered output for the load across said capacitance and inductance;

a second voltage source having an alternating current input and a direct current output and including rectifier means for rectification of the A.C. input voltage to a rectified output voltage, said second voltage source including current limiting means for limiting the output current thereof.

circuit means for connecting the outputs of said first and second voltage sources in aiding relation to the load; and circuit means connected across said output inductance for bypassing said output inductance for fast initial current buildup and including a unidirectional conducting element connected in parallel with said inductance.

9. In a direct current power supply for a load such as a xenon arc lamp or the like, the combination of:

a first voltage source having an alternating current input and a direct current output and including rectifier means for rectification of the alternating current input voltage to a rectified output voltage;

a filter for said rectified output voltage and including a first shunt capacitance and a series output inductance, providing the power supply filtered output for the load across said first capacitance and inductance;

a second voltage source having an alternating current input and a direct current output and including rectifier means for rectification of the A.C. input voltage to a rectified output voltage, said second voltage source including current limiting means for limiting the output current thereof;

circuit means for connecting the outputs of said first and second voltage sources in aiding relation to the load; and circuit means connected across said output inductance for bypassing said output inductance for fast initial current buildup and including a second capacitance connected in parallel with said inductance.

10. In a direct current power supply for a load such as a xenon arc lamp or the like, the combination of:

a first voltage source having an alternating current input and a direct current output and including an autotransformer, a double-throw double-pole switch, a transformer and rectifier unit for rectification of the alternating current input voltage to a rectified output voltage, with the secondary of the transformer connected to the rectifier unit, and with the autotransformer output connected to the moving arms of the switch for connection of the autotransformer across one portion of the transformer primary for one switch position to provide a low voltage standby output and across another portion of the transformer primary for the other switch position to provide a high voltage operate output, and with the alternating current input connected to a terminal of the autotransformer and a terminal of the transformer primary;

a filter for said rectified output voltage and including a first shunt capacitance and a series output inductance, providing the power supply filtered output for the load across said first capacitance and inductance;

a second voltage source having an alternating current input and a direct current output and including rectifier means for rectification of the A.C. input voltage to a rectified output voltage, said second voltage source including current limiting means for limiting the output current thereof;

circuit means for connecting the outputs of said first and second voltage sources in aiding relation to the load, circuit means for bypassing said output inductance for fast initial current buildup and including an impedance element connected in parallel with said inductance; and circuit means for supplying energy to said first capacitance during initial current buildup for maintaining a minimum current and including an energy storage element connected across the rectified output of said first voltage source.

11. In a direct current power supply for a load such as a xenon arc lamp or the like, the combination of:

a voltage source having an alternating current input and a direct current output and including rectifier means for rectification of the alternating current input voltage to a rectified output voltage;

a filter for said rectified output voltage and including a shunt capacitance and a series output inductance, providing the power supply filtered output for the load across said capacitance and inductance; and circuit means connected across said output inductance for bypassing said output impedance for fast initial current buildup and limitation of initial current peak and including an impedance element connected in parallel with said inductance.

References Cited

UNITED STATES PATENTS

| | | | |
|---|---|---|---|
| 3,189,790 | 6/1965 | Nuckolls | 315—289 |
| 2,092,891 | 9/1937 | Overbeck | 307—58 X |
| 2,871,412 | 1/1959 | Lord | 315—205 |
| 2,892,126 | 6/1959 | Popa | 321—15 X |
| 3,037,147 | 5/1962 | Genuit et al. | 315—205 |
| 3,170,084 | 2/1965 | Retzer | 312—173 |

JOHN F. COUCH, *Primary Examiner.*

G. GOLDBERG, *Assistant Examiner.*

UNITED STATES PATENT OFFICE
CERTIFICATE OF CORRECTION

Patent No. 3,365,648 January 23, 1968

Fred Benjamin

It is certified that error appears in the above identified patent and that said Letters Patent are hereby corrected as shown below:

Column 2, line 54, "arm" should read -- arms --; line 58, "operation" should read -- operating --. Column 3, line 53, "Where" should read -- While --; line 71, "riple" should read -- ripple --. Column 5, line 56, "nad" should read -- and --. Column 6, line 58, after "a" insert -- first --. Column 7, line 7, before "terminal" insert -- voltage source across said second --. Column 8, line 40, "thereof." should read -- thereof; --. Column 9, line 30, "load," should read -- load; --. Column 10, line 17, "impedance" should read -- inductance --.

Signed and sealed this 12th day of August 1969.

(SEAL)

Attest:

Edward M. Fletcher, Jr.
Attesting Officer

WILLIAM E. SCHUYLER, JR.
Commissioner of Patents